(12) United States Patent
Watsen et al.

(10) Patent No.: US 8,769,129 B2
(45) Date of Patent: Jul. 1, 2014

(54) SERVER INITIATED SECURE NETWORK CONNECTION

(75) Inventors: Kent A. Watsen, Leesburg, VA (US); Simon J. Gerraty, Sunnyvale, CA (US); Paul Fraley, San Jose, CA (US); Philip A. Shafer, Raleigh, NC (US); Darren Tom, San Jose, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 871 days.

(21) Appl. No.: 11/939,839

(22) Filed: Nov. 14, 2007

(65) Prior Publication Data

US 2009/0125633 A1    May 14, 2009

(51) Int. Cl.
*G06F 15/16*   (2006.01)

(52) U.S. Cl.
USPC .......................................... 709/229; 709/227

(58) Field of Classification Search
USPC ................................................ 709/229, 227
See application file for complete search history.

(56) References Cited

U.S. PATENT DOCUMENTS

| | | | | |
|---|---|---|---|---|
| 7,072,946 | B2 * | 7/2006 | Shafer | 709/217 |
| 7,403,995 | B2 * | 7/2008 | Mace et al. | 709/227 |
| 2004/0143665 | A1 | 7/2004 | Mace et al. | |
| 2007/0083665 | A1 * | 4/2007 | Miao | 709/230 |
| 2007/0180512 | A1 | 8/2007 | Chaudhuri et al. | |

OTHER PUBLICATIONS

European Search Report dated Mar. 27, 2009 for corresponding European Application No. 08152717.8, 5 pgs.
Office Action from corresponding Chinese application No. 200810095095.4, dated Jun. 24, 2011, 13 pp.
Office Action from European application No. 08152717.8, dated Feb. 17, 2011, 3 pp.
Notification of the Second Office Action with translation mailed from The State Intellectual Property Office of P.R.C., Apr. 19, 2012 in corresponding CN Application Serial No. 200810095095.4, 9 pgs.

* cited by examiner

*Primary Examiner* — Andrew Georgandellis
(74) *Attorney, Agent, or Firm* — Shumaker & Sieffert, P.A.

(57) ABSTRACT

In general, the invention is directed to techniques for establishing secure connections with devices residing behind a security device. In accordance with the techniques, a managed device initiates a transmission control protocol (TCP) session to establish a TCP session with a management device such that the management device acts as the TCP server and the managed device acts as a TCP client. Once established, the managed device sends a role reversal message specifying an identity of the managed device via the TCP session. Upon receiving the role reversal message, the management device initiates a secure connection over the TCP session in accordance with a secure protocol such that the management device acts as the secure protocol client and the managed device acts as the secure protocol server. By properly establishing the secure session, each of the devices assumes the proper roles and administrators may more easily configure the devices.

25 Claims, 6 Drawing Sheets

SERVER INITIATED SECURE NETWORK CONNECTION

TECHNICAL FIELD

The invention relates to computer networks and, more particularly, to secure protocols used within computer networks.

BACKGROUND

Due to increasing reliance on network-accessible computers, network security has become a major issue for organizations and individuals. To help ensure the security of their computers, organizations and individuals frequently install security devices between their private networks and public networks. A goal of such security devices is to prevent unwanted or malicious information from the public network from affecting devices in the private network. The security device may also provide "network address translation" functionality, which enables the private network to utilize a single public internet protocol (IP) address when communicating with the public network. Network address translation (NAT) may provide further security from the public network by obscuring the internal structure of the private network from the public network, as well as, reduce costs associated with maintaining a public IP address for each device located within the private network.

One example of a commonly deployed security device is a firewall. A firewall may perform NAT by re-writing the source and/or destination IP addresses included within packets that flow through the firewall. Upon receiving a packet from one of these private devices designated for the public network, the firewall, for example, re-writes the private IP source address assigned to the private device with the single public IP address. Upon receiving a return packet in response to the device's packet, the firewall re-writes the destination address of the return packet with the appropriate private IP address. In this manner, the firewall obscures the internal structure of the private network by making it appear that only one device, e.g., the firewall, sends and receives data via the single public IP address.

While a firewall that performs NAT may obscure the structure of the private network and thereby provide added security, the firewall may also prevent the private devices from participating in certain network protocols. For example, a private device behind a NAT firewall may not act as a transmission control protocol (TCP) server. That is, the private device cannot directly receive and accept a TCP session request from a client on the public side of the NAT firewall because the IP address of the private device itself is not known by devices on the public side of the firewall. The public device only knows the single public IP address used by the firewall. Because TCP requires a public device to know of the IP address of the particular device with which the TCP session is to be established, the public device cannot directly establish a TCP session with the private device behind the NAT firewall. Moreover, many of the secure protocols that operate over a TCP session may not be utilized, as these secure protocols depend on the TCP session.

SUMMARY

In general, the invention is directed to techniques for establishing secure connections with devices residing behind a security device. In particular, the techniques of the invention may enable a management device on one side of the security device, which may implement port mapping, to establish a secure session, e.g., a secure shell (SSH) protocol session, with a managed device on the other side of the security device such that the secure session roles are correctly assigned between the management device and a managed device. That is, techniques are described for allowing the management device and the managed device to dynamically switch roles as a networking stack is instantiated on the devices for supporting the secure protocol session. For example, the techniques allow the managed device to proactively initiate a TCP session with the management device as a TCP client and, upon establishing the TCP session, dynamically switch roles so as to allow the management device to act as a client for any secure communication protocol running on top of TCP.

In this way, the management device can be properly configured to act as the SSH client and the managed device can be configured to act as the SSH server. By properly initiating the SSH secure session from the management device, the secure SSH session can be established in a manner that is both correct in terms of the roles each of the managed and management devices perform (and therefore readily supported and integrated with the software executing thereon) and readily understood by most network administrators. Thus, network administrators may more easily configure the managed and management devices, thereby better assuring both performance and security within the network.

For example, a managed device on a private side of a NAT firewall initiates a transmission control protocol (TCP) session to establish a TCP session with a management device on a public side of the NAT firewall such that the management device accepts the TCP session as a TCP server and the managed device acts as a TCP client. In this way, the limitations or restrictions introduced by the NAT firewall can be avoided. After establishing the underlying TCP session in this manner, the managed device sends a role reversal message to the management device via the TCP session. The role reversal message specifies an identity of the managed device and provides the management device with the ability to securely initiate the secure session, and thereby reverse the client/server roles with respect to the secure session from that of the underlying TCP session.

Upon receiving the role reversal message, the management device initiates a secure connection over the TCP session in accordance with a secure protocol such that the management device acts as the secure protocol client and the managed device acts as the secure protocol server. The secure protocol, such as above described SSH protocol, utilizes an asymmetric authentication scheme to establish the secure connection between the management device and the managed device. The asymmetric authentication scheme may comprise any authentication scheme whereby the information known to each of the secure protocol client and server are unequal, as in a scheme employing usernames and passwords.

In one embodiment, a method comprises receiving, with a management device, an initial transmission control protocol (TCP) synchronize (SYN) packet output by a managed device as a TCP client as a request to initiate a TCP session between the management device and the managed device, outputting a TCP synchronize-acknowledged (SYN-ACK) packet from the management device to accept the TCP session as a TCP server, and after establishing the TCP session, receiving with the management device a role reversal message output by the managed device specifying an identity of the managed device. The method further comprises, upon receiving the role reversal message, initiating, with the management device, a secure shell (SSH) connection over the TCP session in accordance with a secure shell (SSH) protocol such that the management device acts as a client for the SSH protocol and the managed device acts as the server for the SSH protocol.

In another embodiment, a device manages at least one remote device and comprises a control unit that receives an initial transmission control protocol (TCP) synchronize (SYN) packet output by one of the plurality of remote managed devices as a TCP client as a request to initiate a TCP session between the management device and the managed device, outputs to the managed device a TCP synchronize-acknowledged (SYN-ACK) packet to accept the TCP session as a TCP server, and after establishing the TCP session, receives a role reversal message output by the managed device specifying an identity of the managed device. The control unit further, upon receiving the role reversal message, initiates a secure shell (SSH) connection over the TCP session in accordance with a secure shell (SSH) protocol such that the management device acts as a client for the SSH protocol and the managed device acts as the server for the SSH protocol.

In another embodiment, a device manages at least one remote device and comprises a control unit that receives an initial transmission control protocol (TCP) synchronize (SYN) packet output by one of the plurality of remote managed devices as a TCP client as a request to initiate a TCP session between the management device and the managed device, outputs to the managed device a TCP synchronize-acknowledged (SYN-ACK) packet to accept the TCP session as a TCP server, and after establishing the TCP session, receives a role reversal message output by the managed device specifying an identity of the managed device. The control unit further, upon receiving the role reversal message, initiates a secure shell (SSH) connection over the TCP session in accordance with a secure shell (SSH) protocol such that the management device acts as a client for the SSH protocol and the managed device acts as the server for the SSH protocol.

In another embodiment, a computer-readable medium contains instructions. The instructions cause a programmable processor to receive an initial transmission control protocol (TCP) synchronize (SYN) packet output by a managed device as a TCP client as a request to initiate a TCP session between the management device and the managed device, output a TCP synchronize-acknowledged (SYN-ACK) packet from the management device to accept the TCP session as a TCP server, and after establishing the TCP session, receive a role reversal message output by the managed device specifying an identity of the managed device. The instructions further cause the programmable processor to, based on the role reversal message, dynamically reverse client/server roles of the management device when constructing a network stack for communicating with the managed device, and upon receiving the role reversal message, initiate a secure shell (SSH) connection over the TCP session in accordance with a secure shell (SSH) protocol such that the management device acts as a client for the SSH protocol and the managed device acts as the server for the SSH protocol.

In another embodiment, a method comprises initiating a transmission control protocol (TCP) session with a first device to establish the (TCP) session with a second device such that the second device accepts the TCP session as a TCP server and the first device acts as a TCP client and, after establishing the TCP session, receiving with the second device a role reversal message specifying an identity of the first device. The method further comprises, upon receiving the role reversal message, initiating, with the second device, a secure connection over the TCP session in accordance with a secure protocol such that the second device acts as the secure protocol client and the first device acts as the secure protocol server, wherein the secure protocol utilizes an asymmetric authentication scheme to establish the secure connection between the first device and the second device.

In this way, the managed device initiates the TCP session but initiation of the SSH session by the managed device is avoided. If such SSH sessions were instead initiated by the managed device behind the NAT firewall, the roles of the SSH server and SSH client would be reversed in that the management device, with which the administrator interacts, would be forced to operate as the SSH server, which is both incorrect and awkward. The SSH session is awkward in that the SSH server, which is the management device in this scenario, now has to authenticate the SSH client, which is the managed device, even though the management device requires permission from the managed device to make changes to the managed device. Network administrators would likely become confused with this scenario when implementing the SSH session, which may delay and complicate the configuration of the private network and ultimately compromise performance and security. The techniques described herein avoid such confusion and awkwardness. Moreover, the techniques may allow an enterprise to take advantage of infrastructure already deployed within the enterprise by network operators. For example, the techniques may allow a network operator to take advantage of already deployed SSH host key infrastructure.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
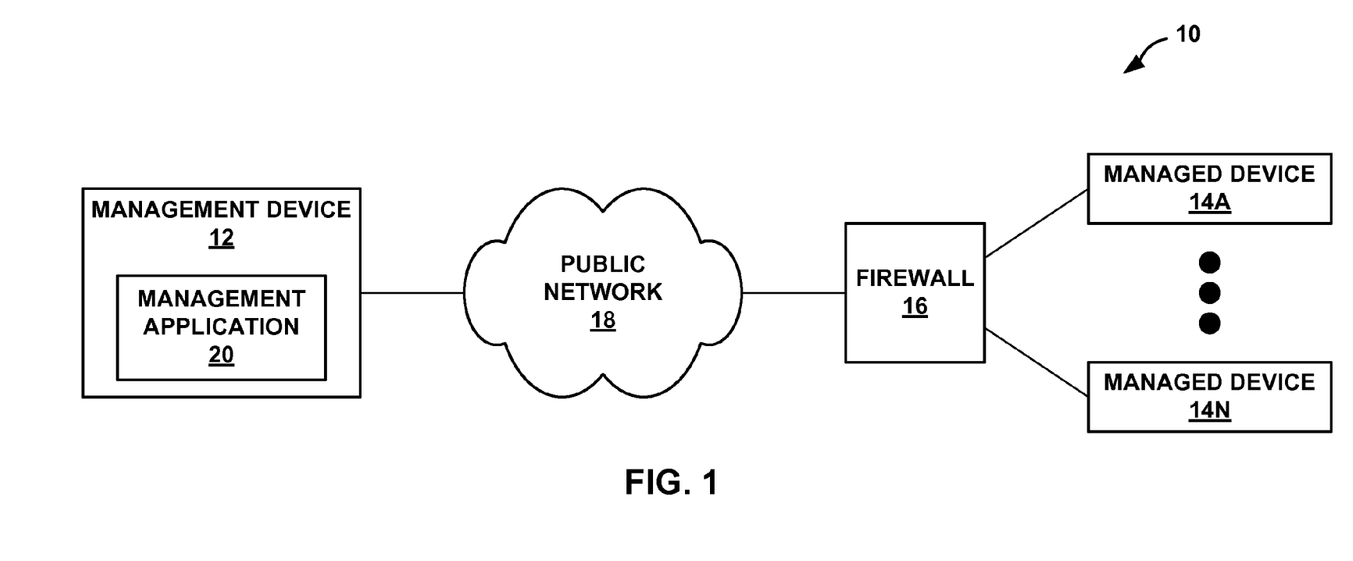
FIG. 1 is a block diagram illustrating an example network system in which a management device and a plurality of managed devices establish secure connections in accordance with the principles of the invention.

FIG. 1 is a block diagram illustrating an example network system 10 in which a management device 12 and a plurality of managed devices 14A-14N establish secure connections in accordance with the principles of the invention. In the example of FIG. 1, management device 12 couples to a firewall 16 via a public network 18. Management device 12 may be any device capable of accessing a network, such as a laptop, a desktop computer, a workstation, a cellular phone, or a network-enabled personal digital assistant (PDA). Managed devices 14A-14N ("managed devices 14") may each comprise any one of a network device that operates within network system 10 and capable of remote configuration. Examples include routers, switches, hubs, application servers, database servers or other network devices. Firewall 16 is merely representative of a network security device, and although shown specifically as firewall 16 in FIG. 1, firewall 16 may be replaced with any other type of secure network device that protects managed devices 12 and other devices from public network 18.

In particular, firewall 16 may perform secure operations so as to separate managed devices 14 from attacks originating from the public side of firewall 16, e.g., from public network 18. Public network 18 may be, for example, the Internet, which includes network and computing devices, such as those described above, coupled together such that they may communicate data packets. Firewall 16 may permit, deny, or proxy data originating from public network 18 and may perform each of the above depending on firewall rules with respect to protocols, ports, trusted IP addresses and the like. That is, firewall 16 may, for example, limit access to managed devices 14 by blocking incoming packets for many protocols and ports unless authentication and secure communication is first established with firewall 16, e.g., by way of a virtual private network (VPN) or other secure session terminated by the firewall. Firewall 16 may also perform network address translation (NAT) that presents a single public internet protocol (IP) address for managed devices 14 when communicating with public network 18. Firewall 16 may, in some instances, implement NAT by use of a technique herein referred to as "port mapping."

To perform NAT by way of port mapping, firewall 16 may map the internal private IP addresses assigned to each of managed device 14 to different protocol ports that each of managed devices 14 respectively uses to communicate to an external or public IP address. Commonly, the pairing of IP addresses and ports is referred to as a "tuple," and therefore the port map maintains mappings between private IP/port tuples to public IP/port tuples. Upon receiving a packet from one of managed devices 14, firewall 16 may rewrite a source IP address field of the packet that originally specifies the internal private IP address assigned to this managed device 14 with one of a plurality of public IP addresses assigned to and maintained by firewall 16 according to the port map. Firewall 16 may also rewrite a port field of the packet that originally specifies the private port to which this managed device 14 connects to firewall 16 with one of the public ports based on the port map. After rewriting these fields, firewall 16 may forward the packet such that it appears to public network 18 that firewall 16 is the source for the packet, thereby obscuring managed devices 14 and their interconnections with one another, e.g., the private network.

Upon receiving the response packet to the packet sent by this managed device 14, firewall 16 determines the IP address and port for which the packet is destined from the response packet. Firewall 16, using the public IP address and public port from the response packet as the key, i.e., the public IP/port tuple, accesses the port map to determine the internal private IP address/port tuple of this managed device 14, and re-writes the IP destination address and port of the response packet with those mapped in the port mapping. Again, from the perspective of public network 18, it appears as if a single device, e.g., firewall 16, connects to public network 18, instead of multiple devices 14. Firewall 16 may therefore obscure the internal configuration of managed devices 14, thereby limiting what public network 18 knows about managed devices 14 and consequently provide additional security.

As shown in FIG. 1, management device 12 executes management application 20. Typically, management applications, such as management application 20, are utilized to facilitate the management of networking elements, e.g., managed devices 14, especially when a large number of managed devices 14 are under the management of a single organization or network. Management application 20 implements the server initiated secure network connection techniques described herein in order to securely manage managed devices 14. In particular, management software 20 enables management device 12 to establish the secure session, such as a secure shell (SSH) protocol session, such that the SSH roles are correctly assigned between management device 12 and one of managed devices 14. That is, management device 12 acts as the SSH client and one of managed devices 14 acts as the SSH server even though such a configuration is not easily achieved in view of firewall 16.

More specifically, techniques described herein allow management devices 14 and managed device 12 to dynamically switch roles as a networking stack is instantiated on each of the devices for supporting the secure SSH session. For example, the techniques allow each of managed devices 14 to proactively initiate a TCP session as a TCP client to management device 14 and, upon establishing the TCP session, dynamically switch roles so as to allow management device 12 to act as an SSH client for the SSH secure communication protocol running on top of TCP session.

For example, each of managed devices 14 initiates a transmission control protocol (TCP) session to establish a TCP session with management device 12 such that management device 12 accepts the TCP session as a TCP server and the managed devices 14 acts as TCP clients. After establishing their respective TCP session, the managed device 14 sends and management device 12 receives a role reversal message specifying an identity of the one of managed devices 14. The role reversal message provides management application 20 of management device 12 with the information necessary to securely initiate and establish the secure SSH session on top of the TCP session, and thereby reverse the client/server roles with respect to the secure session from that of the underlying TCP session.

Upon receiving the role reversal message, management application 20 of management device 12 initiates a secure connection over the TCP session in accordance with a secure protocol, e.g., the SSH protocol, such that management device 12 acts as the secure protocol client and the one of managed devices 14 acts as the secure protocol server. The secure protocol, such as above described SSH protocol, utilizes an asymmetric authentication scheme to establish the secure connection between the management device and the managed device.

The asymmetric authentication scheme may comprise any authentication scheme whereby the information known to each of the secure protocol client and server are unequal, as in a scheme employing usernames and passwords. That is, management device 12 has a unique user name and password for logging into each of managed devices 14, and each of managed devices 14 may have SSH authentication information that is required for management device 12 to authenticate each of managed devices 14. Thus, for managed devices 14 to initiate the secure connection (i.e., to act as the SSH client) much information would have to be swapped between management device 12 and managed devices 14 to facilitate establishing this atypical secure connection where the secure roles would be reversed, e.g., management device 12 acts as the secure protocol server and managed devices 14 act as the secure protocol clients. Because this information is "sensitive," or likely best kept secret, swapping of the information becomes hazardous to the safety of the private network, or managed devices 14. The techniques described herein for dynamically reversing roles when establishing the secure session avoid this awkward and incorrect configuration.

As a result, administrators managing the private network may, via the SSH-server initiated secure network connection techniques, forgo this configuration that may otherwise possibly compromise security. Instead, the administrators are able to configure the secure session between management device 12 and managed devices 14 in a straightforward manner. The manner is more straightforward because, for example, the server initiated secure network connection techniques allow management device 12 to act as the SSH client and managed devices 14 to act as the SSH server in accordance with customary secure protocol configuration despite the possible NAT functions performed by firewall 16. By properly establishing the client/server roles with respect to the secure session in a manner that is reversed from the client/server roles of the underlying TCP session, this secure session is both correct in terms of the roles each of management device 12 and managed devices 14 perform and readily understood by most network administrators. Network administrators may, therefore, more easily configure management devices 12 and managed devices 14, thereby better assuring both performance and security within a private network such as might be formed by managed devices 14.

Figure 2:
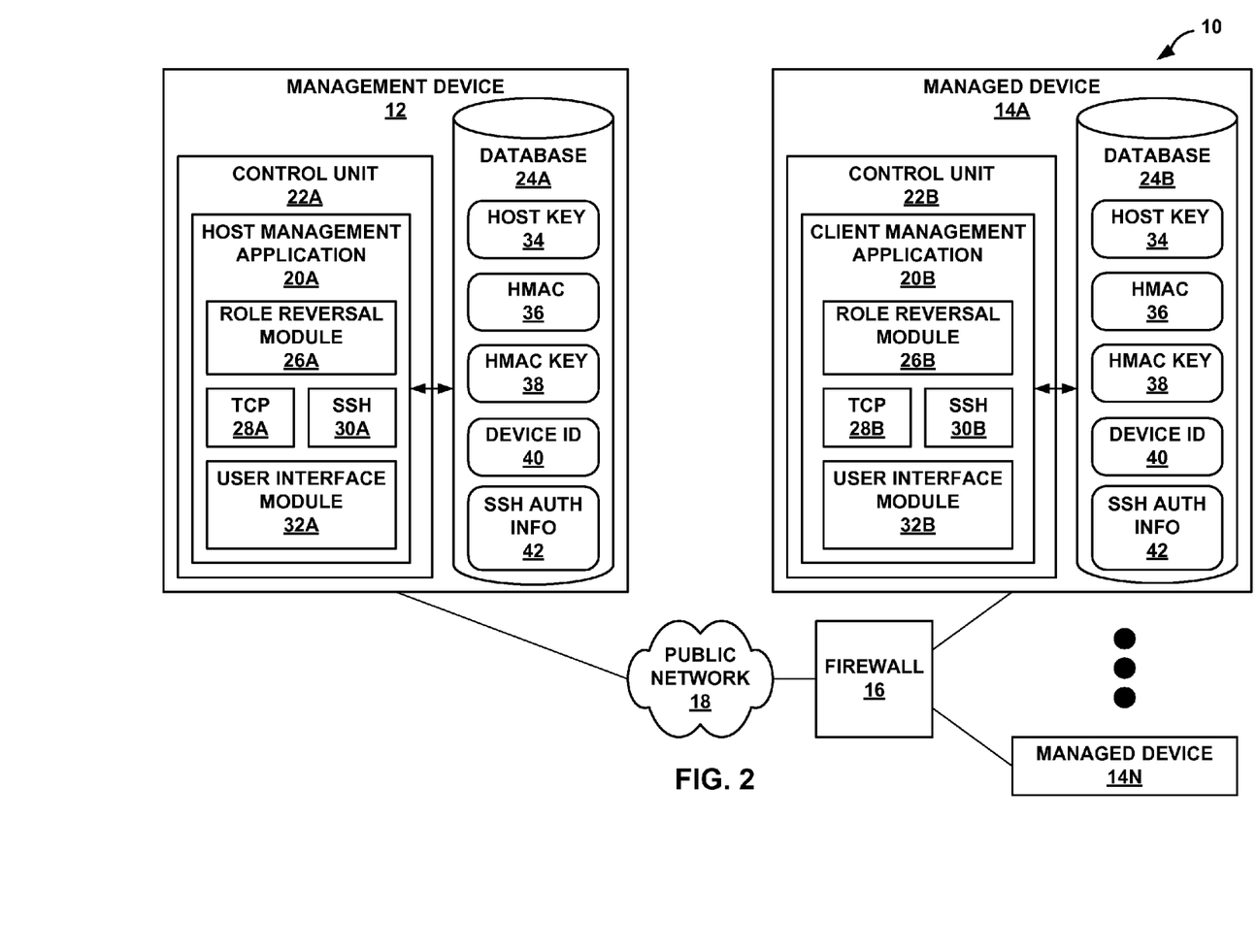
FIG. 2 is a block diagram illustrating network system of FIG. 1 in further detail.

FIG. 2 is a block diagram illustrating portions of network system 10 in further detail. As described above, management device 12 and managed devices 14 operate in accordance with the server initiated secure network connection techniques described herein. For purposes of example the techniques are described in reference to managed device 14A, but one or more of managed devices 14 may operate in accordance with the techniques. Thus, while described in reference to establishing a single secure connection with managed device 14A, management device 12 may establish a plurality of secure connections with two or more of managed devices 14. Furthermore, only managed device 14A is discussed in detail below for ease of illustration purposes; however, each of managed devices 14 may be substantially similar to managed device 14A in that each of managed devices 14 may comprise similar components for performing the techniques described herein. The techniques therefore should not be limited strictly to the below described exemplary embodiment.

As shown in FIG. 2, management device 12 includes the above described management application 20, which is shown as "host management application 20A" in FIG. 2. Management device 12 and managed device 14A each comprise a respective control unit 22A, 22B ("control units 22"). Control unit 22A executes host management application 20A, and control unit 22B executes client management application 20B. Host management application 20A and client management application 20B ("management applications 20") each comprise respective role reversal modules 26A, 26B ("role reversal modules 26"), TCP modules 28A, 28B (shown as "TCP 28A" and "TCP 28B" in FIG. 2, herein "TCPs 28"), SSH modules 30A, 30B (shown as "SSH 30A" and "SSH 30B" in FIG. 2, herein "SSHs 30"), and user interface modules 32A, 32B ("user interface modules 32").

Role reversal modules 26, as described in more detail below, are responsible for dynamically performing client/server role reversal during construction of the network stack in which the TCP server (i.e., the device that accepts the TCP session) becomes the SSH client and the TCP client (i.e., the device that initiates the TCP session) becomes the SSH server. TCPs 28 are representative modules for initiating and maintaining a TCP session in accordance with TCP. SSHs 30 initiate and maintain a SSH session in accordance with the SSH protocol on top of the TCP session. User interface modules 32 represent the necessary software interfaces that enable a user to configure respective management applications 20 such that management device 12 may remotely and securely configure managed device 14A despite firewall 16 in accordance with the principles of the invention.

Management device 12 and managed device 14A maintain respective databases 24A, 24B ("databases 24") to control dynamic construction of the SSH secure connection and the underlying TCP session. Databases 24 may comprise any type of flat or table, hierarchical, network, or relational database. An exemplary relational database is a structured query language (SQL) database.

Databases 24 stores a variety of information for controlling authentication and the construction of the secure network connection, including a host key 34, a keyed-hash message authentication code (HMAC) 36, a HMAC key 38, a device identifier 40 ("device ID 40" in FIG. 2), and SSH authentication information 42 ("SSH auth info 42" in FIG. 2).

HMAC 36 provides a mechanism for message authentication using cryptographic hash functions. As one example, HMAC 36 is calculated for host key 34 according to Request for Comments (RFC) 2104, titled "HMAC: Key-Hashing for Message Authentication," prepared by the Network Working Group of the Internet Engineering Task Force (IETF), dated February 1997, herein incorporated by reference. Device ID 40 represents a unique identifier assigned to a respective device, including a unique one for each of managed devices 14 that is under management by management device 12. SSH authentication information 42 provides the necessary information for authenticating management device 12 to managed device 14A.

Although shown as a particular type of storage structure, e.g., databases, the techniques may accommodate any type of storage medium capable of storing the above described data relevant for implementing the techniques in accordance with the principles of the invention, such as any form of static memory (e.g., a hard drive, an optical drive, and a FLASH memory) and volatile memory (e.g., random access memory (RAM), static RAM (SRAM), a dynamic RAM (DRAM)). Further, the techniques may be implemented by instructions stored to a computer-readable medium that cause a programmable processor, e.g., control units 22, to perform the server-initiated secure network connection techniques described in more detail below.

Initially, a user, such as a network administrator, interacts with management device 12 via user interface module 32A to configure host management application 20A when initialing deploying the managed device 14A within network system 10. More particularly, the administrator may specify HMAC key 38 and SSH authentication information 42, e.g., a username and password. Host management application 20A may then automatically generate a device ID 40 and present this device ID 40 to the administrator for use in configuring management device 14A. From HMAC key 38 (referred to as the "secret key" in RFC 2104), host management application 20A may generate HMAC 36 for host key 34 in accordance with RFC 2104. Host management application 20A stores host key 34, HMAC 36, HMAC key 38, device ID 40, and SSH authentication information 42 to database 24A, as shown in FIG. 2.

Next, the administrator configures client management application 20B. Again, the administrator may specify HMAC key 38 and SSH authorization information 42, however, the administrator also need specify device ID 40. As described above in reference to host management application 20A, client management application 20B, based on HMAC key 38 (the "secret key" of RFC 2104), may compute HMAC 36 for host key 34 in accordance with RFC 2104. Similar to host management application 20A, client management application 20B may store host key 34, HMAC 36, HMAC key 38, device ID 40, and SSH authentication information 42 to database 24B, as shown in FIG. 2.

Once configured and deployed within network system 10, managed device 14A and, more particularly, client management application 20B initiates a TCP session with management device 12 in order to establish a TCP session in accordance with TCP 28B. In the example illustrated in FIG. 2, client management application 20B initiates the TCP session to overcome the NAT operation performed by firewall 16. Although described herein in reference to overcoming this NAT operation, the server initiated secure network connection techniques may apply equally in other circumstances where the device is configured to initiate the connection with host management application 20A.

The techniques may be desirable to many network operators that prefer to have "open" ports in their local administrative data centers, i.e., configured on management device 12 rather than on all of managed devices 14 (a port is viewed as "open" on a management device 12 if the communication port is enabled for receiving inbound connection requests). The administrator may prefer that the open-port reside on management device 14 for many reasons. First, from a security standpoint, it is easier to secure a single open port on management device 12 than it is to secure a large number of ports on different, perhaps geographically distributed devices, as would be the case if multiple managed devices 14 and/or intermediate firewalls were required to maintain inbound open-ports. Second, the administrator may prefer this configuration, again from a security standpoint, because the administrator may not want managed devices 12 to be "detectable" on the network. That is the administrator may not want to be forced to manage devices 14 in a way that makes the devices detectable outside the protected enterprise. If the devices 14 are configured to maintain an open-port and listen for connection requests, the managed devices may be exposed to detection by other potentially malicious entities on the network, such as entities executing malicious port-scanning software. Third, from a performance and reliability standpoint, the administrator may prefer this configuration because this configuration protects devices 14 from denial of service attacks, which often target open-ports and halt or degrade performance of enterprise functions. Fourth, again from a performance standpoint, the administrator may prefer this configuration because this configuration requires that management device 14 handle the construction and maintenance of the SSH communication sessions, thereby alleviating devices 14 from having to setup and teardown the SSH connections. Thus, for any of the above reasons, the administrator may prefer devices 14 initiate the connection rather than management device 12, and the invention should not be strictly limited to the firewall embodiment described herein.

Regardless of the particular motivation, client management application 20B may initiate the TCP session by causing TCP 28B to act as a TCP client and send a TCP synchronize or "SYN" packet to management device 12. Client management application 20B may determine when to send this packet in a number of different ways.

In one instance, client management application 20B may attempt to establish a persistent TCP session upon power-up or some other event. In another instance, client management application 20B may attempt to establish a short-term or periodic TCP session at regular intervals, which may be particularly useful when management device 12 manages a large number of devices 14 and cannot maintain numerous persistent TCP sessions simultaneously. Yet another instance that also enables management device 12 to manage a large number of devices provides that client management application 20B only attempt to establish a TCP session on-demand when it needs to contact management device 12, such as to perform a system upgrade, upload error messages, log or backup data, issue an alert, or for any other reason.

As additional examples, client management application 20B may first attempt to establish a persistent TCP session, but upon management device 12 dropping the presumed persistent TCP session, client management application 20B may instead switch to a periodic TCP session, as the dropped TCP session may indicate that management device 12 no longer maintain persistent TCP sessions. As another example, client management application 20B may be configured to establish a TCP session only when it needs to contact management device 12 (i.e., in response to an internal event), but if no contact is required for a certain amount of time (e.g., 30 seconds), client management application 20B may proceed to establish the periodic TCP session. In this manner client management 20B may use a combined periodic on-demand TCP session. In any event, client management application 20B may cause TCP 28B to transmit a SYN packet to management device 12.

Firewall 16 may perform NAT on the outbound SYN packet produced by managed device 14A, whereby firewall 16 replaces the source IP address in the SYN packet, i.e., the private IP address assigned to managed device 14A, with one of a plurality of public IP addresses assigned to firewall 16. Firewall 16 may employ port mapping to determine which private IP address/port tuple associates with which public IP address/port tuple, and may rewrite the private IP address and port with the public IP address and port in the respective IP source address and port fields of the SYN packet. Firewall 16, after finishing the NAT operations, forwards the SYN packet to public network 18 for delivery to management device 12.

Management device 12 and, more particularly, host management application 20A receives the SYN packet. TCP 28A, acting as the TCP server, responds to the SYN packet by replying with a synchronize-acknowledged or "SYN-ACK" packet, which is transmitted across public network 18, through firewall 16 (where it undergoes NAT operations), and received by TCP 28B. TCP 28B continues the TCP handshake as the TCP client by responding to the SYN-ACK packet with an acknowledge or "ACK" packet, whereupon receipt of the ACK packet by TCP 28A formally signifies the establishment of the TCP session between host management application 20A and client management application 20B. As client management application 20B initiated the TCP session, client management application 20B acts as the TCP client and host management application 20A, because it accepted the TCP session, acts as the TCP server.

After establishing the TCP session, client management application 20B utilizes role reversal module 26B to dynamically change client/server roles at this point of construction of the internal network stacks for the communication session. Moreover, with respect to the communication session, management device 12 and managed device 14A reverse client server roles after the establishment of the TCP session is complete and prior to initiating any additional communication protocols on top of the TCP session.

Specifically, role reversal module 26B sends a role reversal message to role reversal module 26A to trigger the client/server role reversal. Again, the message may undergo the above described NAT operations performed by firewall 16 and traverse public network 18 to reach role reversal module 26A. The role reversal message is described in more detail with reference to FIG. 3; however, generally the role reversal message conveys the necessary information that enables SSH 30A to authenticate client management application 20B and thereby allows host management application 20A to act as the SSH client and client management application 20B to act as the SSH server. Role reversal modules 26 derive the "role reversal" portion of their labels by enabling the TCP client, e.g., client management application 20B, to become the SSH server and the TCP server, e.g., host management application 20A, to become the SSH client, thereby reversing the roles from TCP client to SSH server and TCP server to SSH client contrary to conventional techniques.

Role reversal message 26A, which may also be referred to herein as a "device-conn-info" or "device-connection-information" message, causes SSH 30A to lookup the records for managed device 14A within database 24A based on the device ID to authenticate managed device 14A. If the host-key received from managed device 14A differs from that stored in database 24A, host management application 20A authenticates the passed host-key by comparing the calculated value for sha-1 (host key 34, HMAC key 38) and the passed HMAC value. If they match, then the host management application 20A stores the new host-key in database 24A. In this way, role reversal module 26A may receive one or more messages from various managed devices 14, each containing a device ID 40, host key 34, HMAC 36, and HMAC key 38 from the role reversal message.

Based on this information, role reversal module 26A may ascertain whether to "trust" each managed device 14. That is the role reversal message may send a security certificate in the form of host key 34 and a digital signature in the form of HMAC 36. Role reversal module 26A may "sign" the security certificate, e.g., host key 34, using the digital signature, e.g., HMAC 36. If the certificate can be successfully signed, role reversal module 26A may therefore trust each managed device 14 that has sent the requisite security certificate and digital signature.

Assuming the role reversal message allows role reversal module 26A to trust managed device 14A, for example, role reversal module 26A invoke SSH 30A to trigger initiation of the SSH protocol. That is, the SSH 30A operates as an SSH client and outputs an SSH transport connect message on the TCP session to establish the first SSH layer, i.e., the SSH transport layer. The SSH protocol can be understood as a three-layer protocol that requires two layers before setting up the third or session layer. The first and lowest layer is known as the "transport" layer and represents the layer by which the cryptographic tunnel through public network 18 is established. This transport layer handles the initial key exchange, and establishment of a cryptographic tunnel on top of the TCP session Upon setting up the first cryptographic tunnel, SSH 30A is prompted by SSH 30B for authentication information so that SSH 30B can authenticate management device 12 and establish the second SSH layer. SSH 30A may provide SSH authentication information 42, e.g., a username and password, which SSH 30B compares against its own SSH authentication information 42. Assuming SSH 30B accepts SSH 30A's SSH authentication information 42, SSH 30A may establish the third and final connection or session layer, over which secure communication may take place. Because SSH 30A initiated the SSH secure connection and SSH 30B accepted the secure connection, management device 12 acts as the SSH client and managed device acts as the SSH server, despite the NAT operation performed by firewall 16. Thus, by way of having managed device 14 initiate the TCP session and the TCP server, e.g., management device 12, initiate the SSH session, firewall 16 may not prevent management device 12 and managed device 14A from assuming the proper secure protocol roles.

Because an administrator configures HMAC key 38 for both managed device 14A and management device 12, HMAC key 38 typically is set to a value that the administrator can easily remember, as the administrator may not configure each in succession or may not want to write down a long string of random numbers that provide a more cryptographically-strong key. Thus, HMAC key 38 may represent what may be referred to as a "first connection one-time-password." That is, HMAC key 38 may be used to initially configure an encrypted tunnel through public network 18 but only for the first connection. After forming the first connection, host management application 20A and client management application 20B may agree to a more cryptographically-strong HMAC key 38, generate new host keys 34 and HMACs 36 in accordance with RFC 2104, and store this information to databases 24, as above. For successive connections, management applications 20B may utilize the more secure HMAC keys 38.

Figure 3:
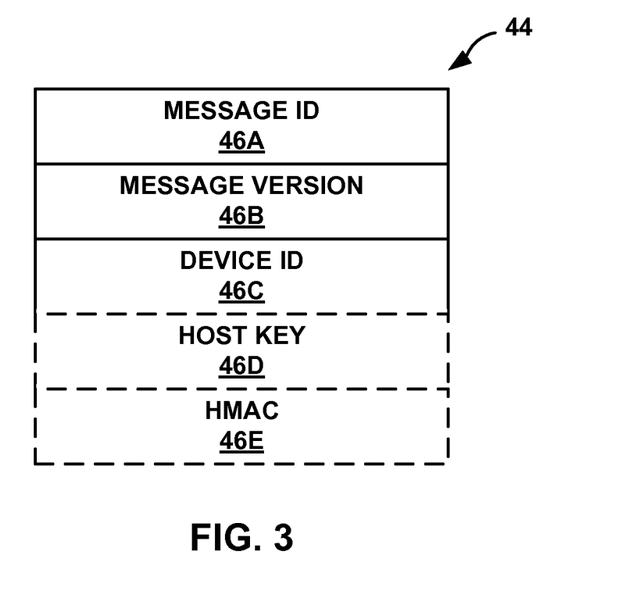
FIG. 3 is a diagram illustrating an exemplary role reversal message generated in accordance with the server initiated secure network connection techniques described herein.

FIG. 3 is a diagram illustrating an exemplary format of role reversal message 44 generated in accordance with the server-initiated secure network connection techniques described herein. In this example, role reversal message 44 comprises a number of fields 46A-46E. Fields 46A-46C are shown as solid lined boxes to indicate that these may be required fields in one embodiment, which should be specified every time role reversal message 44 is generated. Fields 46D-46E are shown as dashed lined boxes to indicate that these are optional fields that need not be specified every time role reversal message 44 is generated.

As described above, a role reversal module, such as role reversal module 26B of FIG. 2, included within a managed device, such as managed device 14A, may generate role reversal message 44 dynamically when the managed device is constructing the network stack for communicating with a management device. Role reversal module 26B may specify a message identifier (ID) in message ID field 46A. The message ID may indicate a sequential number or some other identifier for determining the respective order of role reversal message 44 in a sequence of role reversal messages. Role reversal module 26B may also specify a message version in message version field 46B. The message version indicates the version role reversal message 44, such as whether message 44 includes only mandatory fields 46A-46C or both mandatory and optional fields 46A-46E or whether message 44 is formulated according to a first version or a second later version. Further, role reversal module 26B may specify a device ID, such as device ID 40, device ID field 46C. As described above, device ID 40 may comprise a unique identifier assigned to each device, including managed devices 14, that is under management by management device 12.

Role reversal module 26B may optionally specify a host key, such as host key 34, and an HMAC, such as HMAC 36, in respective host key field 46D and HMAC field 46E. These fields 46D-46E may be optional because managed device 14A may not have been configured with host key 34 and HMAC 36 prior to forming the TCP session and the SSH session may therefore be initially unsecure. Thus, role reversal module 26B may indicate host key 34 and HMAC 36 in respective fields 46D-46E only if an administrator has configured HMAC key 38 and client management application 20B has generated host key 34 prior to forming the TCP session. Both of host key 34 and HMAC 36 may be termed "public keys" in that these can be freely transmitted over a public or unsecure connection, such as a TCP session, without fear of corrupting the values. HMAC key 38, however, may be termed a "private key" or "secret key" and thus cannot be freely exchanged over a public or unsecure connection, which is why no HMAC key field exists in exemplary role reversal module 44. HMAC key 38 may be configured via some other more secure method, such as by an administrator interacting locally or via a secure remote connection with a user interface presented by one or both of user interface modules 32, thereby preserving the security of the subsequent SSH connection.

Figure 4:
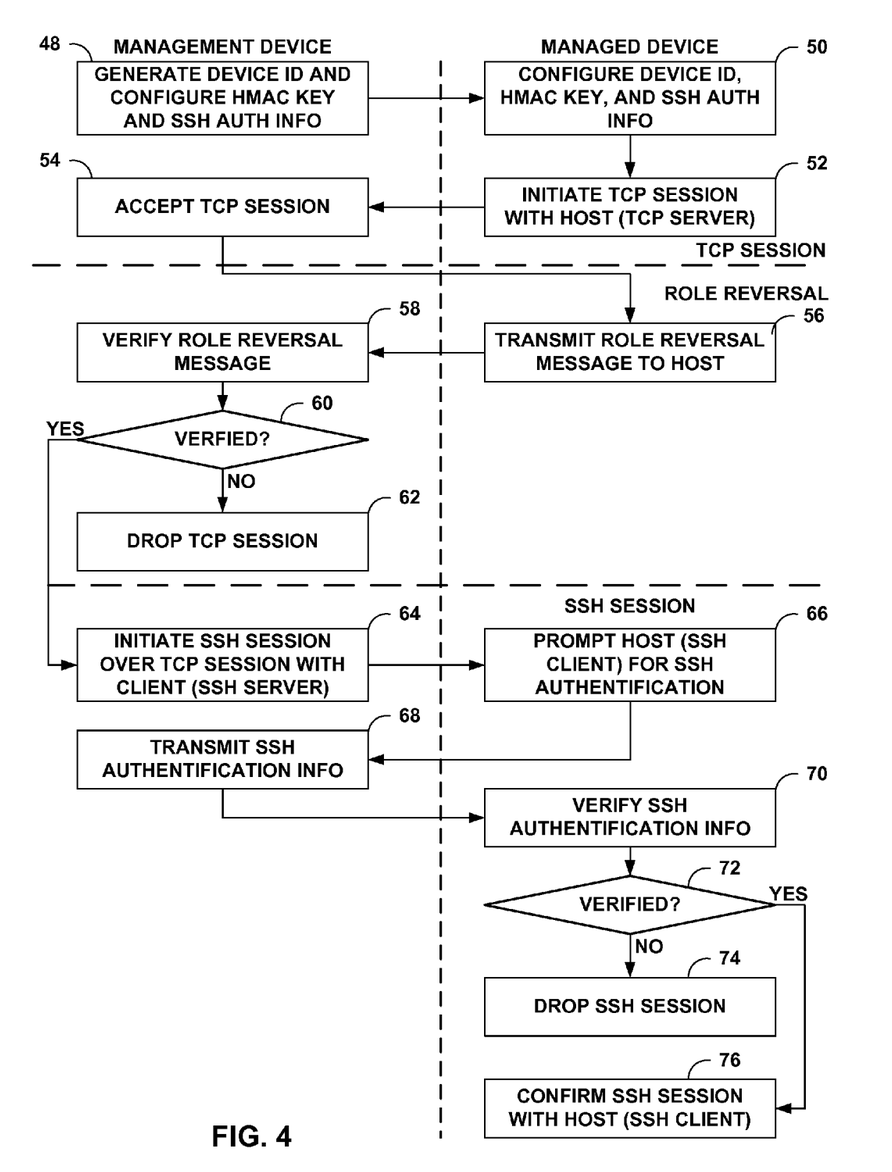
FIG. 4 is a flowchart illustrating exemplary operation of a management device and a managed device in establishing a secure connection according to the server initiated secure network connection techniques described herein.

FIG. 4 is a flowchart illustrating exemplary operation of a management device and a managed device in establishing a secure connection according to the server initiated secure network connection techniques described herein. The flowchart shown in FIG. 4 has been divided into five distinct parts each illustrating a different role. The left hand section illustrates the operation the management device carries out in executing its various roles, which for purposes of illustration will be described in reference to management device 12 of FIG. 2. The right hand section illustrates the operations carried out by the managed device in executing its various roles, which for purposes of illustration will be described in reference to managed device 14A of FIG. 2. Moreover, the operations of management device 12 and managed device 14A have been separated by function with respect to: (i) establishing the TCP session, (ii) dynamically reversing client/server roles, (iii) establishing the SSH session on top of the TCP session.

More particularly, the top left section illustrates operations management device 12 executes in order to assume the TCP server role in an accepting a TCP session. The middle left section illustrates authentication and role reversal functions, and the bottom left section illustrates the operations management device 12 executes in order to assume the SSH client role in a SSH session. The top right section illustrates the operations managed device 14A executes in order to assume the TCP client role for the TCP session. The middle right section illustrates role reversal operation s of the managed device 14A and the bottom right section illustrates the operations managed device 14A executes to assume the SSH server role for the SSH session.

Initially, an administrator, an automated script, or some other device configures management device 12 by specifying HMAC key 38 and SSH authorization information 42 within database 24A, as described above. If an administrator or other users perform the configuration, they may perform the configuration via a user interface presented by user interface module 32A. Management device 12 typically also generates a device ID 40, which the administrator, for example, notes for use in configuring management device 14A (48). Next, the administrator, automated script, or some other device configures managed device 14A by specifying device ID 40, HMAC key 38, and SSH authorization information 42 within database 24B, as described above (50). Again, this configuration may occur via a user interface presented by user interface module 32B.

Via one of the above described TCP initiation techniques (e.g., periodic TCP initiation), client management application 20B initiates a TCP session with host management application 20A, which acts as the TCP server (52). TCP 28A accepts the TCP session as the TCP server in accordance with TCP by sending a SYN-ACK message, and receiving an ACK message (54). Client management application 20B, upon successfully establishing the TCP session, utilizes role reversal module 26B to transmit a role reversal message, such as role reversal message 44 of FIG. 3, to role reversal module 26A (56). Role reversal module 26A verifies the role reversal message in either of two ways (58).

In the first instance where the role reversal message is of the first version, e.g., contains only fields 46A-46C, role reversal module 26A may receive only device ID 40 as stored on database 24B and compares it to device ID 40 as stored on database 24A (60). If the two devices IDs 40 do not match, e.g., device ID 40 as stored on database 24B has not yet been stored to database 24A, host management application 20A may drop the TCP session (62), and thereby prevent further actions via SSH 30A. In another instance where the role reversal message is of the second version, e.g., contains all of fields 46A-46E, role reversal module 26A may compare device ID 40 as stored on database 24B to that of device ID 40 as stored on database 24A. If they do not match, e.g., device ID 40 as stored on database 24B has not yet been stored to database 24A, host management application 20A may still drop the TCP session (62). The difference between the instances comes after each has successfully matched device IDs 40.

In the first instance, upon successfully matching device IDs 40 (60), role reversal module 26A invokes SSH 30A and directs SSH 30A to initiate an SSH session over the TCP session with client management application 20B, which thus acts as the SSH server. In the second instance, however, role reversal module 26A may authenticate the host key and HMAC values sent via host key and HMAC fields 46D, 46E, respectively using its HMAC key 38 stored to database 24A according to the above incorporated RFC 2104.

If host management application 20A manages multiple managed devices 14, database 24A may store a database record that associates each of host key 34, HMAC 36, HMAC key 38, device ID 40, and SSH authentication information 42 to one another and may include a similar record for each of managed devices 14. Host management application 20A may look up the appropriate HMAC key 38 using the device ID sent via device ID field 46C as the lookup key. Because the device ID and HMAC key are associated within database 24A and the device ID is a unique identifier, the lookup is sure to return the appropriate HMAC key 38, which host management application 20A can use to verify the host key and HMAC sent in host key field 46D and HMAC field 46E, respectively. In any event, if SSH 30A cannot verify these values in accordance with RFC 2104 (60), it may drop the TCP session 62. If these values can be verified, SSH 30A proceeds to initiate the SSH session over the TCP session, as described above (64).

As further described above, SSH 30B replies to the SSH initiation request by prompting SSH 30A, e.g., the SSH client, for SSH authentication information 42, e.g., a password and username (66). In response to the prompt, SSH 30A transmits SSH authentication information 42 to SSH 30B, which verifies SSH authentication information 42 (68, 70). SSH 30B may verify received SSH authentication information 42 by comparing it to SSH authentication information 42 stored to database 24B (72). Again, database 24B may store multiple associations similar to that of database 24A only these associations may be for management devices instead of managed devices. If these do not match, SSH 30B drops the SSH session (74). However, if these match, SSH 30B confirms the SSH session with SSH 30A, which acts as the SSH client (76). Thus, a secure connection can be established between a management device and a managed device despite a firewall, such as firewall 16, in accordance with the server initiated secure network connection techniques.

While the server initiated secure network connection techniques are described herein in reference to overcoming a firewall that implements NAT, the techniques by dissociating the TCP connection from the SSH connection further enable more flexibility in configuring the sessions between management devices and respective managed devices. For example, management device 12 may further manage other devices that are not behind a NAT firewall, such as firewall 16. Management device 12 may not require these non-blocked devices to initiate the TCP session, and instead, management device 12 may initiate the TCP session, as well as, the SSH session. Management device 12 may still require managed devices 14 to initiate the TCP session, as described above; however, by having SSH-roles independent of TCP-roles, management device 12 presents an administrator with more flexibility in managing devices in a wide range of configuration.

This is particularly useful, when an administrator may desire to re-configure devices if, for example, some or all of managed devices 14 are moved from behind firewall 16. The administrator need not swap secure information stored to databases 24, but instead may re-configure devices 12, 14 to operate such that management device 12 establishes the TCP session with those managed devices 14 not behind firewall 16. Management device 12 need not be re-configured with respect to SSH; the management devices still initiates the SSH session so that none of the information stored to databases 24 need be swapped. Thus, the server initiated secure network connection techniques may facilitate the reconfiguration of managed devices 14 by making such reconfiguration less burdensome and more secure.

Figure 5A:
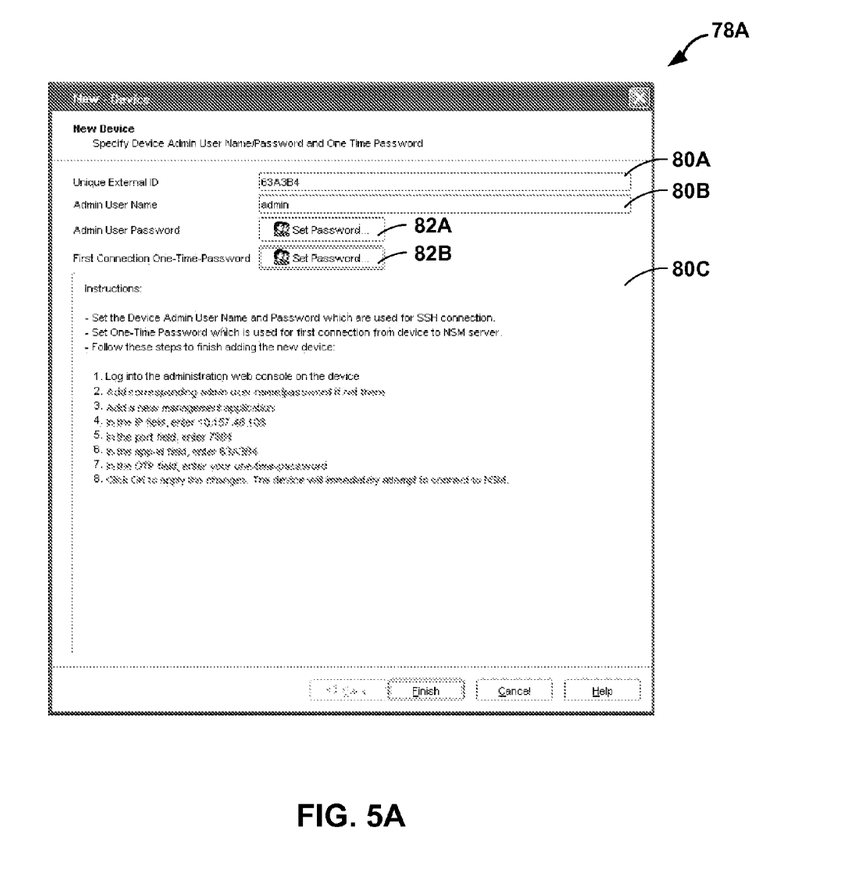
FIGS. 5A-5B are screenshots illustrating an example user interface presented by user interface modules each of which execute within a respective management device and managed device that operate in accordance with the principles of the invention.
Figure 5B:
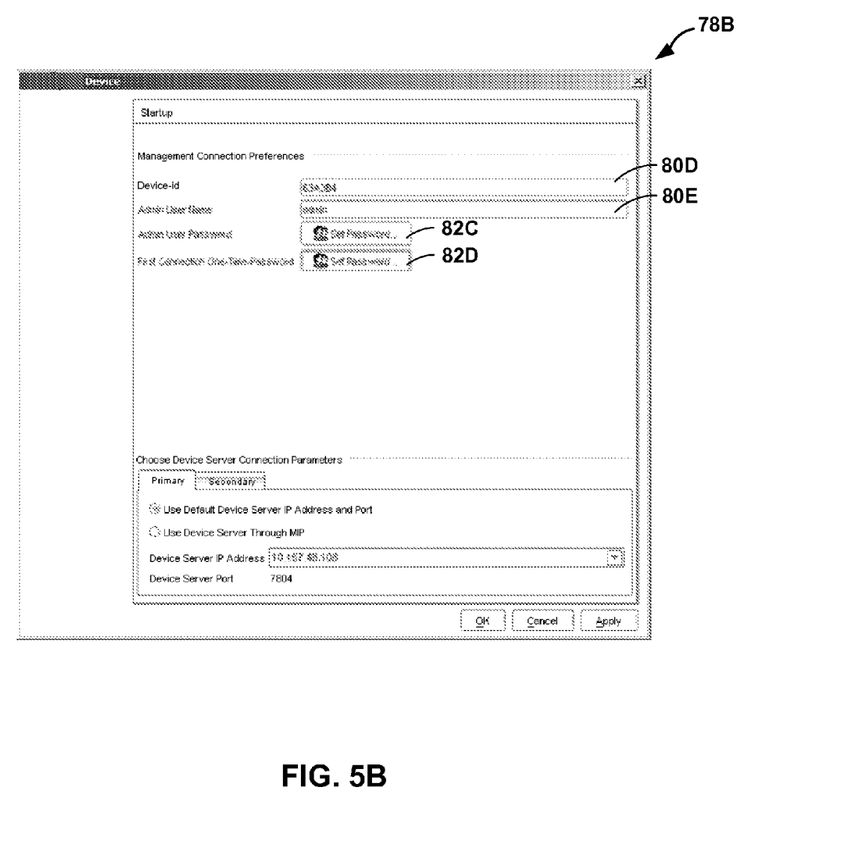

FIGS. 5A-5B are screenshots illustrating an example user interface 78A and 78B presented by user interface modules each of which execute within a respective management device and managed device that operate in accordance with the principles of the invention. FIG. 5A is a screenshot illustrating user interface 78A presented by a user interface module, such as user interface module 32A, executing within a management device, such as management device 12 FIG. 5B is a screenshot illustrating user interface 78B presented by a user interface module, such as user interface module 32B, executing within a managed device, such as managed device 14A. An administrator or some other user may interact with each of user interfaces 78A, 78B ("user interfaces 78") to configure respective management device 12 and managed device 14A such that these devices operate in accordance with the techniques described herein.

As shown in FIG. 5A, user interface 78A comprises fields 80A-80C and buttons 82A, 82B. Device ID field 80A (labeled "Unique External ID" in FIG. 5A) provides an display or possibly input field for displaying device ID 40 generated by host management application 20A or possibly enabling an administrator to specify device ID 40, respectively. Usemame input field 80B (labeled "Admin User Name" in FIG. 5A) allows the administrator to input a username, which is stored within SSH authentication information 42 of database 24A. Display field 80C presents a series of instructions that may guide the user in configuring not only management device 12 and but also managed device 14A. Password button 82A (labeled "Admin User Password" in FIG. 5A) allows the administrator, when selected, to specify a password, which is stored within SSH authentication information 42 of database 24A. Password button 82B (labeled "First Connection One-Time-Password") enables the administrator, when selected, to specify a first connection one-time password or HMAC key 38 of database 24A. In this manner, the administrator may interact with user interface 78A to view generated device ID 40 via device ID field 80A and specify SSH authentication information 42 and HMAC key 38 via username input 80B, password button 82A, and password button 82B.

As shown in FIG. 5B, user interface 78B comprises fields 80D, 80E and buttons 82C, 82D. Device ID field 80D (labeled "app-id" in FIG. 5B) provides an input field for specifying device ID 40 generated by host management application 20A. According to the instruction of display field 80C, the administrator is to enter into device ID field 80D the device ID presented within device ID field 80A. Thus, FIG. 5B shows this device ID 40 entered in device ID field 80D. Usemame input field 80E (labeled "Admin User Name" in FIG. 5B) allows the administrator to input a username, which is stored within SSH authentication information 42 of database 24B, similar to username input field 80B. Password button 82C (labeled "Admin User Password" in FIG. 5B) allows the administrator, when selected, to specify a password, which is stored within SSH authentication information 42 of database 24B, similar to password button 82A. Password button 82D (labeled "First Connection One-Time-Password") enables the administrator, when selected, to specify a first connection one-time password or HMAC key 38 of database 24B, similar to password button 82B. In this manner, the administrator may interact with user interface 78B to specify generated device ID 40, SSH authentication information 42, and HMAC key 38 via device ID field 80D, username input 80B, password button 82A, and password button 82B.

Although user interfaces 78 are shown as comprising a number of different fields 80A-80E and buttons 82A-82D, user interfaces 78 may include any type of field, input, button, or other user interface component capable of enabling a user to view and/or enter HMAC key 38, device ID 40, and SSH authentication information 42. For example, user interfaces 78 may include radio-style buttons allowing the user to select any one of a variety of choices of usernames. User interfaces 78 may further presents an input field to accept each password described above. This password input field may present asterisks in place of the letters entered to prevent viewers form compromising the security offered by the passwords. Thus, user interfaces 78 as described herein are merely examples and should not limit the scope of the server initiated secure network connection techniques described herein.

Various embodiments of the invention have been described. These and other embodiments are within the scope of the following claims.

The invention claimed is:
1. A method comprising:
receiving, with a management device, an initial transmission control protocol (TCP) synchronize (SYN) packet output by a managed device as a TCP client to request that a TCP session be initiated between the management device and the managed device;
outputting a TCP synchronize-acknowledged (SYN-ACK) packet from the management device to accept the TCP session as a TCP server;
after establishing the TCP session, receiving with the management device a role reversal message output by the managed device specifying an identity of the managed device;
authenticating, with the management device, the managed device based on the identity of the managed device specified in the role reversal message; and
based on the authentication of the managed device, initiating, with the management device, a single secure shell (SSH) connection over the TCP session in accordance with a secure shell (SSH) protocol such that the management device acts as a client for the SSH protocol and the managed device acts as the server for the SSH protocol without initiating any other SSH connections over the TCP session prior to initiating the single SSH connection over the TCP session.

2. The method of claim 1, wherein the SSH protocol utilizes an asymmetric authentication scheme to establish the secure connection between the management device and the managed device.

3. The method of claim 2, wherein the SSH protocol utilizes an asymmetric authentication scheme by requiring the management device acting as the SSH client to provide username and password authentication information to the managed device acting as the SSH server.

4. The method of claim 1, wherein receiving the initial TCP SYN packet comprises receiving, with the management device, the initial TCP SYN packet output by the managed device from a security device that separates the managed device from the management device.

5. The method of claim 4, wherein receiving the initial TCP SYN packet further comprises receiving, with the management device, an initial TCP SYN packet output by the managed device and upon which the security device performed network address translation by re-writing a source internet protocol (IP) address field of the TCP SYN packet so that the source IP address field specifies a public IP address instead of a private IP address assigned to the managed device.

6. The method of claim 4, wherein receiving the role reversal message comprises receiving, with the management device, the role reversal message specifying the identity of the managed device from the security device.

7. The method of claim 4, wherein initiating the SSH connection comprises, upon receiving the role reversal message, initiating, with the management device through the security device, the SSH connection over the TCP session in accordance with the SSH protocol such that the management device acts as the client for the SSH protocol and the managed device acts as the server for the SSH protocol.

8. The method of claim 7, further comprising receiving, with the management device, a plurality of SSH messages on which network address translation was performed by the security device, wherein the security device performs network address translation by re-writing a source internet protocol (IP) address field of the SSH messages so that the source IP address field specifies a public IP address instead of a private IP address assigned to the managed device.

9. The method of claim 1,
wherein receiving the initial TCP SYN packet comprises receiving the initial TCP SYN packet output by a managed device as the TCP client as the request to initiate one of a persistent TCP session, a periodic TCP session, and an on-demand TCP session between the management device and the managed device, and
wherein initiating the SSH connection includes initiating the SSH connection over the one of the persistent TCP session, the periodic TCP session, and the on-demand TCP session.

10. The method of claim 1, wherein receiving the role reversal message includes receiving with the management device a role reversal message specifying three or more of a message identifier (ID), a message version, a device ID, a host key, and a keyed-hash message authentication code (HMAC).

11. The method of claim 1, further comprising:
receiving input from a user via a first user interface presented by a user interface model of the management device specifying a keyed-hash message authentication code (HMAC) key and secure protocol authentication information employed by the SSH protocol to establish the secure connection between the management device and the managed device;
generating a device identifier (ID) used for configuring the managed device; and
presenting the device ID via the user interface to the user.

12. A device that manages at least one remote device and that comprises:
a control unit that receives an initial transmission control protocol (TCP) synchronize (SYN) packet output by one of the plurality of remote managed devices as a TCP client to request that a TCP session be initiated between the management device and the managed device,
wherein the control unit includes a TCP module that outputs to the managed device a TCP synchronize-acknowledged (SYN-ACK) packet to accept the TCP session as a TCP server,
wherein the control unit also includes a role reversal module that, after establishing the TCP session, receives a role reversal message output by the managed device specifying an identity of the managed device,
wherein the control unit further includes a secure shell (SSH) module that authenticates the managed device based on the identity of the managed device specified in the role reversal message and, based on the authentication of the managed device, initiates a single SSH connection over the TCP session in accordance with an SSH protocol such that the management device acts as a client for the SSH protocol and the managed device acts as the server for the SSH protocol without initiating any other SSH connections over the TCP session prior to initiating the single SSH connection over the TCP session, and
wherein the control unit includes at least one hardware unit that executes one or more of the TCP module, the role reversal module and the SSH module.

13. The device of claim 12, wherein the SSH protocol utilizes an asymmetric authentication scheme to establish the secure connection between the management device and the managed device.

14. The device of claim 13, wherein the SSH protocol requires the management device acting as the SSH client to provide username and password authentication information to the managed device acting as the SSH server.

15. The device of claim 12, wherein the control unit receives the initial TCP SYN packet output by the managed device from a security device that separates the managed device from the management device.

16. The device of claim 15, wherein the control unit further receives an initial TCP SYN packet output by the managed device and upon which the security device performed network address translation by re-writing a source internet protocol (IP) address field of the TCP SYN packet so that the source IP address field specifies a public IP address instead of a private IP address assigned to the managed device.

17. The device of claim 15, wherein the role reversal module receives the role reversal message specifying the identity of the managed device from the security device.

18. The device of claim 15, wherein the SSH module initiates the SSH connection through the security device over the TCP session in accordance with the SSH protocol such that the management device acts as the client for the SSH protocol and the managed device acts as the server for the SSH protocol.

19. The device of claim 18, wherein the SSH module further receives a plurality of SSH messages on which network address translation was performed by the security device from the managed device, wherein the security device performs network address translation by re-writing a source internet protocol (IP) address field of the SSH messages so that the source IP address field specifies a public IP address instead of a private IP address assigned to the managed device.

20. The device of claim 12,
wherein the control unit receives the initial TCP SYN packet by receiving the initial TCP SYN packet output by a managed device as the TCP client as the request to initiate one of a persistent TCP session, a periodic TCP session, and an on-demand TCP session between the management device and the managed device, and
wherein the SSH module initiates the SSH connection over the one of the persistent TCP session, the periodic TCP session, and the on-demand TCP session.

21. The device of claim 12, wherein the role reversal module receives a role reversal message specifying three or more of a message identifier (ID), a message version, a device ID, a host key, and a keyed-hash message authentication code (HMAC).

22. The device of claim 12, wherein the control unit further includes a user interface module that (i) presents a user interface, (ii) receives input from a user via the user interface specifying a keyed-hash message authentication code (HMAC) key and secure protocol authentication information employed by the SSH protocol to establish the secure connection between the management device and the managed device, (iii) generates a device identifier (ID) used for configuring the managed device, and (iv) displays the device ID within the user interface.

23. A device that manages at least one remote device and that comprises:
a control unit that receives an initial transmission control protocol (TCP) synchronize (SYN) packet output by one of the plurality of remote managed devices as a TCP client to request that a TCP session be initiated between the management device and the managed device,
wherein the control unit includes a TCP module that outputs to the managed device a TCP synchronize-acknowledged (SYN-ACK) packet to accept the TCP session as a TCP server,
wherein the control unit comprises a role reversal module that, after establishing the TCP session, receives a role reversal message output by the managed device specifying an identity of the managed device and, based on the role reversal message, dynamically reverses the client/server roles of the management device when constructing a network stack for communicating with the managed device,
wherein the control unit also comprises a secure shell (SSH) module that authenticates the managed device based on the identity of the managed device specified in the role reversal message and, based on the authentication of the identity of the managed device, initiates a single SSH connection over the TCP session in accordance with an SSH protocol such that the management device acts as a client for the SSH protocol and the managed device acts as the server for the SSH protocol without initiating any other SSH connections over the TCP session prior to initiating the single SSH connection over the TCP session, and
wherein the control unit includes at least one hardware unit that executes one or more of the TCP module, the role reversal module and the SSH module.

24. The device of claim 23, wherein the role reversal module dynamically reverses the TCP sever role to the SSH client role after establishing the TCP session and prior to establishing the SSH connection portions of the network stack.

25. A non-transitory computer-readable storage medium comprising instructions for causing a programmable processor of a management device to:
receive an initial transmission control protocol (TCP) synchronize (SYN) packet output by a managed device as a TCP client to request that a TCP session be initiated between the management device and the managed device;
output a TCP synchronize-acknowledged (SYN-ACK) packet from the management device to accept the TCP session as a TCP server;
after establishing the TCP session, receive a role reversal message output by the managed device specifying an identity of the managed device;
based on the role reversal message, dynamically reverse client/server roles of the management device when constructing a network stack for communicating with the managed device;
authenticate the managed device based on the identity of the managed device specified in the role reversal message; and
based on the authentication of the identity of the managed device, initiate a single secure shell (SSH) connection over the TCP session in accordance with a secure shell (SSH) protocol such that the management device acts as a client for the SSH protocol and the managed device acts as the server for the SSH protocol without initiating any other SSH connections over the TCP session prior to initiating the single SSH connection over the TCP session.

* * * * *